(12) United States Patent
Lu et al.

(10) Patent No.: US 11,397,820 B2
(45) Date of Patent: Jul. 26, 2022

(54) METHOD AND APPARATUS FOR PROCESSING DATA, COMPUTER DEVICE AND STORAGE MEDIUM

(71) Applicant: BEIJING BAIDU NETCOM SCIENCE AND TECHNOLOGY CO., LTD., Beijing (CN)

(72) Inventors: Wei Lu, Beijing (CN); Fei Zhou, Beijing (CN); Linjiang Lian, Beijing (CN); Meng Wang, Beijing (CN); Xianhui Niu, Beijing (CN)

( * ) Notice: Subject to any disclaimer, the term of this patent is extended or adjusted under 35 U.S.C. 154(b) by 556 days.

(21) Appl. No.: 16/352,567

(22) Filed: Mar. 13, 2019

(65) Prior Publication Data
US 2019/0325147 A1    Oct. 24, 2019

(30) Foreign Application Priority Data
Apr. 18, 2018 (CN) .......................... 201810350926.1

(51) Int. Cl.
  G06F 21/60       (2013.01)
  H04L 9/06        (2006.01)
  H04L 9/08        (2006.01)
  H04L 9/16        (2006.01)
  H04L 67/1097     (2022.01)

(52) U.S. Cl.
  CPC ............ G06F 21/602 (2013.01); H04L 9/065 (2013.01); H04L 9/083 (2013.01); H04L 9/0894 (2013.01); H04L 9/16 (2013.01); H04L 67/1097 (2013.01)

(58) Field of Classification Search
  CPC ....... H04L 9/065; H04L 9/083; H04L 9/0894; H04L 9/16; H04L 67/1097; G06F 21/602
  See application file for complete search history.

(56) References Cited

U.S. PATENT DOCUMENTS

| | | | | |
|---|---|---|---|---|
| 9,286,491 B2* | 3/2016 | Roth | ............. | G06F 21/6254 |
| 9,680,809 B2* | 6/2017 | Seul | ............. | H04L 9/085 |
| 10,454,679 B2* | 10/2019 | Tamura | ............. | G06F 21/6218 |
| 2014/0013112 A1* | 1/2014 | Cidon | ............. | G06F 16/137 |
| | | | | 713/165 |
| 2014/0019753 A1* | 1/2014 | Lowry | ............. | H04L 9/083 |
| | | | | 713/155 |
| 2014/0126723 A1* | 5/2014 | Zhang | ............. | H04L 9/0822 |
| | | | | 380/279 |
| 2015/0310219 A1* | 10/2015 | Haager | ............. | H04L 9/0894 |
| | | | | 713/165 |
| 2016/0292429 A1* | 10/2016 | Manville | ............. | G06F 16/1748 |
| 2017/0286698 A1* | 10/2017 | Shetty | ............. | G06F 16/182 |
| 2017/0338949 A1* | 11/2017 | Amiri | ............. | H04L 63/0428 |
| 2018/0041336 A1* | 2/2018 | Keshava | ............. | G06F 21/33 |
| 2018/0139042 A1* | 5/2018 | Binning | ............. | H04L 9/3297 |
| 2018/0196948 A1* | 7/2018 | Chen | ............. | G06F 21/6209 |

FOREIGN PATENT DOCUMENTS

| | | |
|---|---|---|
| CN | 103546547 | 1/2014 |
| CN | 104852949 | 8/2015 |
| CN | 107070881 | 8/2017 |

* cited by examiner

*Primary Examiner* — Hee K Song
(74) *Attorney, Agent, or Firm* — Knobbe, Martens, Olson & Bear, LLP (57) ABSTRACT

Some embodiments disclose a method and apparatus for processing data, a computer device and a storage medium. A method can include: acquiring, by a cloud storage system, a series of slices obtained by dividing a to-be-stored file; encrypting, by the cloud storage system, each slice by using a different data key; and storing, by the cloud storage system, an encrypted data ciphertext.

17 Claims, 4 Drawing Sheets

METHOD AND APPARATUS FOR PROCESSING DATA, COMPUTER DEVICE AND STORAGE MEDIUM

CROSS-REFERENCE TO RELATED APPLICATIONS

This application claims priority to Chinese Patent Application No. 201810350926.1, filed on Apr. 18, 2018, titled "Method and apparatus for processing data, computer device and storage medium," which is hereby incorporated by reference in its entirety.

TECHNICAL FIELD

The present disclosure relates to computer application technologies, specifically to a method and apparatus for processing data, a computer device and a storage medium.

BACKGROUND

In the era of data explosion, enterprises and individuals all face the problem of massive data storage. Building a safe and reliable data storage service requires a lot of manpower, material resources and financial resources. Cloud computing companies provide multiple forms of data storage services, solving the problem of user data management, and allowing users to focus on their own core businesses.

However, storing data on the cloud causes many users to worry about the data security. In order to let the users to use the cloud storage service while avoiding the fear of leakage of core data, a universal solution is to encrypt the data and then store the encrypted data in a cloud storage system.

Figure 1:
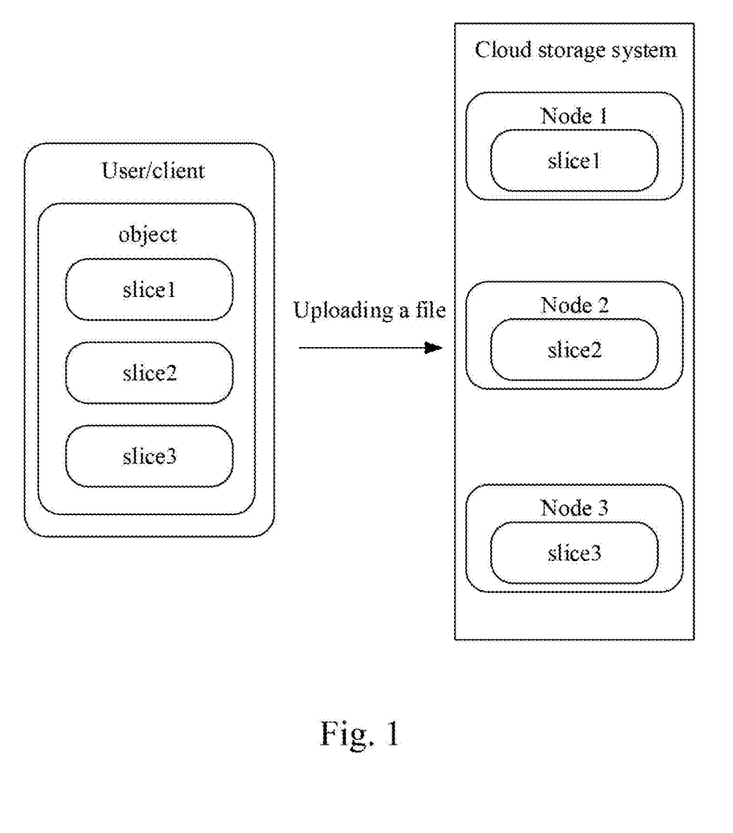
FIG. 1 is a schematic diagram of an existing method for storing a file.

In the cloud storage system, a file uploaded by a user (referred to as an object in object storage) is divided into a plurality of slices, and the slices are respectively encrypted and then stored using a key. As shown in FIG. 1, FIG. 1 is a schematic diagram of an existing method for storing a file.

However, the above method also has certain problems in practical applications, such as: the use granularity of the key is too large, if the slices in multiple files use the same key for encryption, then, once the key is compromised, the security of large amounts of data cannot be guaranteed.

SUMMARY

In view of this, the present disclosure provides a method and apparatus for processing data, a computer device and a storage medium.

The specific technical solution is as follows.

A method for processing data, including: acquiring, by a cloud storage system, a series of slices obtained by dividing a to-be-stored file; encrypting, by the cloud storage system, each slice by using a different data key; and storing, by the cloud storage system, an encrypted data ciphertext.

According to an embodiment of the present disclosure, encrypting, by the cloud storage system, each slice by using a different data key includes: encrypting, by the cloud storage system, each slice according to a data key acquired from a key management system; and the method further includes: when any data ciphertext needs to be decrypted, decrypting, by the cloud storage system, the data ciphertext according to a data key corresponding to the data ciphertext and acquired from the key management system.

According to an embodiment of the present disclosure, the method further includes: buffering, by the cloud storage system, the data key acquired from the key management system, wherein the buffered data key includes: an unused data key and a used data key; when any slice needs to be encrypted, encrypting, by the cloud storage system, the slice using the buffered unused data key; and when any data ciphertext needs to be decrypted, if the data key corresponding to the data ciphertext is buffered, decrypting, by the cloud storage system, the data ciphertext using the buffered data key.

According to an embodiment of the present disclosure, the method further includes: dynamically adjusting, by the cloud storage system, the buffered data key.

According to an embodiment of the present disclosure, the method further includes: when performing data writing, encrypting, by the cloud storage system, existing data in a buffer, while writing data into the buffer, and writing encrypted data ciphertext into a back-end by the cloud storage system; and when performing data reading, decrypting, by the cloud storage system, existing data in a buffer, while writing data into the buffer, and returning decrypted data plaintext to a user.

According to an embodiment of the present disclosure, each data key in the key management system is encrypted using a master key and stored in a form of ciphertext; each master key is encrypted using a root master key and stored in a form of ciphertext; and each root master key is encrypted and stored using a hardware encryptor.

According to an embodiment of the present disclosure, when any slice needs to be encrypted, acquiring, by the cloud storage system, a data key in a form of plaintext and a data key in a form of ciphertext corresponding to the slice from the key management system, encrypting the slice using the data key in the form of plaintext, and storing encrypted data ciphertext and the data key in the form of ciphertext; and when any data ciphertext needs to be decrypted, sending, by the cloud storage system, the data key in the form of ciphertext stored together with the data ciphertext to the key management system, acquiring the data key in the form of plaintext returned by the key management system, and decrypting the data ciphertext according to the data key in the form of plaintext.

An apparatus for processing data, applied to a cloud storage system, including: an acquiring unit and an encryption and decryption unit; wherein the acquiring unit is configured to acquire a series of slices obtained by dividing a to-be-stored file; and the encryption and decryption unit is configured to encrypt each slice by using a different data key, and store an encrypted data ciphertext.

According to an embodiment of the present disclosure, the encryption and decryption unit is configured to encrypt each slice according to a data key acquired from a key management system; and the encryption and decryption unit is further configured to, when any data ciphertext needs to be decrypted, decrypt the data ciphertext according to a data key corresponding to the data ciphertext and acquired from the key management system.

According to an embodiment of the present disclosure, the encryption and decryption unit is further configured to: buffer the data key acquired from the key management system, wherein the buffered data key includes: an unused data key and a used data key; when any slice needs to be encrypted, encrypt the slice using the buffered unused data key; and when any data ciphertext needs to be decrypted, if the data key corresponding to the data ciphertext is buffered, decrypt the data ciphertext using the buffered data key.

According to an embodiment of the present disclosure, the encryption and decryption unit is further configured to dynamically adjust the buffered data key.

According to an embodiment of the present disclosure, the encryption and decryption unit is further configured to: when performing data writing, encrypt existing data in a buffer, while writing data into the buffer, and write encrypted data ciphertext into a back-end; and when performing data reading, decrypt existing data in a buffer, while writing data into the buffer, and return decrypted data plaintext to a user.

According to an embodiment of the present disclosure, each data key in the key management system is encrypted using a master key and stored in a form of ciphertext; each master key is encrypted using a root master key and stored in a form of ciphertext; and each root master key is encrypted and stored using a hardware encryptor.

According to an embodiment of the present disclosure, when any slice needs to be encrypted, the encryption and decryption unit is configured to acquire a data key in a form of plaintext and a data key in a form of ciphertext corresponding to the slice from the key management system, encrypt the slice using the data key in the form of plaintext, and store encrypted data ciphertext and the data key in the form of ciphertext; and when any data ciphertext needs to be decrypted, the encryption and decryption unit is configured to send the data key in the form of ciphertext stored together with the data ciphertext to the key management system, acquire the data key in the form of plaintext returned by the key management system, and decrypt the data ciphertext according to the data key in the form of plaintext.

A computer device, including a memory, a processor, and a computer program stored on the memory and runnable on the processor, wherein when the processor executes the program, implements the method as described above.

A computer readable storage medium, storing a computer program thereon, wherein the computer program, when executed by a processor, implements the method as described above.

Based on the above description, it can be seen that by adopting the solution of the present disclosure, after the cloud storage system acquires a series of slices obtained by dividing a to-be-stored file, each slice may be encrypted by using a different data key, and then the encrypted data ciphertext is stored. It may be seen that the solution of the present disclosure adopts a key encryption solution of slice granularity, thereby avoiding the problems in the prior art and further improving the security of the data.

DETAILED DESCRIPTION OF EMBODIMENTS

In order to make the technical solution of the present disclosure clearer, the solution of the present disclosure is further described below with reference to the accompanying drawings and the embodiments.

It is apparent that the described embodiments are part of the embodiments of the present disclosure, rather than all of the embodiments. All other embodiments obtained by those skilled in the art based on the embodiments of the present disclosure without creative efforts are within the scope of the present disclosure.

Figure 2:
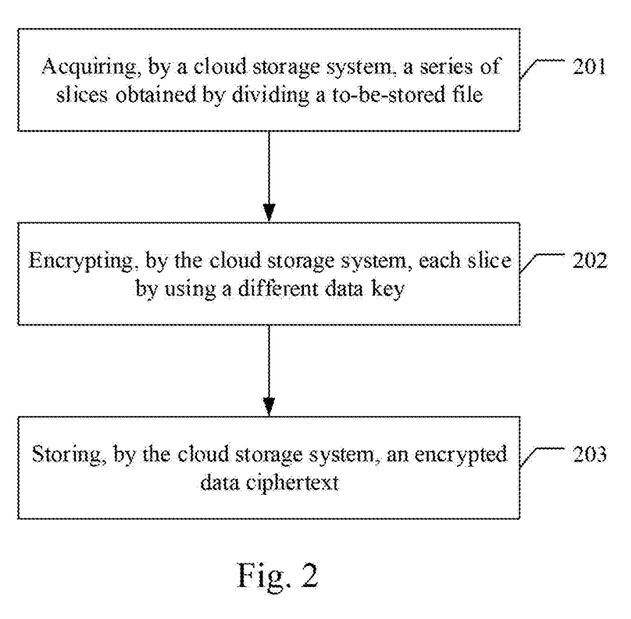
FIG. 2 is a flowchart of an embodiment of a method for processing data according to the present disclosure.

FIG. 2 is a flowchart of an embodiment of a method for processing data according to the present disclosure. As shown in FIG. 2, the method includes the following implementations.

In step 201, acquiring, by a cloud storage system, a series of slices obtained by dividing a to-be-stored file.

Preferably, the operation of dividing a to-be-stored file into a series of, that is, multiple slices, may be completed by a cloud storage system.

After receiving a write request from a user, the cloud storage system may divide the to-be-stored file uploaded by the user into multiple slices. The size of each slice is usually the same except for the last slice.

For example, if the size of the to-be-stored file is 3.8 M and is divided into four slices, namely slice1, slice2, slice3, and slice4, then the size of slice1, slice2, and slice3 each may be 1 M, and the size of slice4 is 0.8 M.

In step 202, encrypting, by the cloud storage system, each slice by using a different data key.

In the present embodiment, each slice is encrypted by using a key encryption method of slice granularity, and using a different key, i.e., data key.

Figure 3:
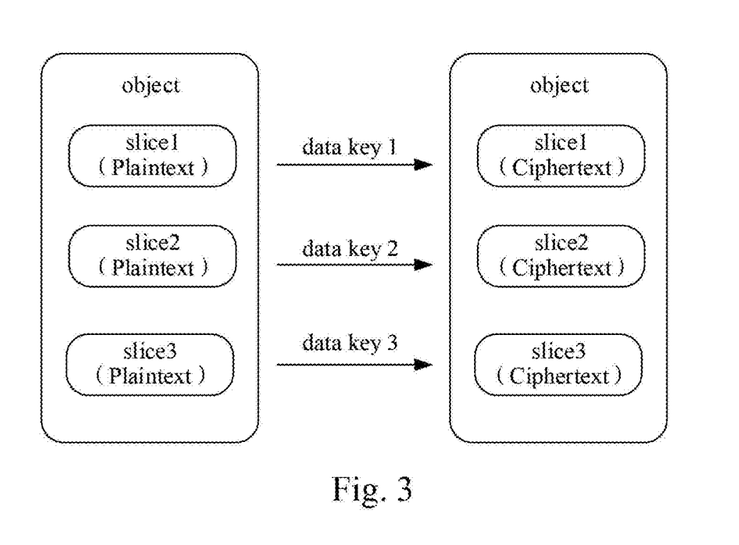
FIG. 3 is a schematic diagram of an encryption method according to an embodiment of the present disclosure.

FIG. 3 is a schematic diagram of an encryption method according to an embodiment of the present disclosure. As shown in FIG. 3, assuming that the to-be-stored file (i.e., object) is divided into three slices, and each slice in the form of plaintext is encrypted by using a different data key, to obtain a slice in the form of ciphertext, that is, data ciphertext.

In step 203, storing, by the cloud storage system, an encrypted data ciphertext.

The cloud storage system may store the encrypted data ciphertext according to the existing method.

It can be seen that with the solution described in the present embodiment, the security is greatly improved compared to the method in which multiple files are encrypted by using the same key in the prior art.

If a file in the cloud storage system is compared to a file in real life, encryption is equivalent to placing the file in a locked box. Decryption is equivalent to opening the box with a key and getting the file. The method in which multiple files are encrypted by using the same key is equivalent to placing multiple files in the same box for locking in real life. While adopting the solution described in the present embodiment is equivalent to dividing a file into several segments and each segment is locked with a separate box. Obviously, the latter method may greatly improve the security of the data.

In addition, the encryption algorithm in the cloud storage system mostly uses a symmetric encryption algorithm. The symmetric encryption algorithm uses a key to encrypt and decrypt data. Since the key may be used to decrypt the data, the security of the key directly determines the security of the encrypted data on the cloud. In the prior art, the security of the key is not well guaranteed. The key and the data ciphertext are usually stored in the same system, as such a data stealer may obtain the data ciphertext and the key from the same system at the same time, and thus the data ciphertext may be directly decrypted using the key.

However, in the present embodiment, the data ciphertext and the data key may be stored separately. For example, the data ciphertext is stored in the cloud storage system, and the data key is stored in the key management system.

Accordingly, the cloud storage system may encrypt each slice according to the data key acquired from the key management system. Moreover, when it is required to decrypt any data ciphertext, the cloud storage system may decrypt the data ciphertext according to the data key corresponding to the data ciphertext acquired from the key management system. For example, when a read request of the user for a certain file is acquired, the data ciphertext corresponding to the file needs to be decrypted, and then the decrypted data plaintext is returned to the user.

The cloud storage system and the key management system are two independent systems that use different identification and authentication methods to further improve the security of data by storing data ciphertext and data keys separately.

In addition, in order to improve system performance, the dynamic key buffering and the streaming encryption and decryption mechanism are further adopted in the present embodiment, which are respectively introduced as follows.

1) Dynamic Key Buffering

In the present embodiment, in order to improve the security of data, two independent systems of the key management system and the cloud storage system are provided. The cloud storage system needs to request the key management system multiple times during encryption and decryption. In order to avoid an increase in user request delay due to remote procedure invoking between systems, the dynamic key buffering mechanism is employed in the present embodiment.

Specifically, the cloud storage system may buffer the data key acquired from the key management system, and the buffered data key may include: an unused data key and a used data key. When any slice needs to be encrypted, the cloud storage system may directly encrypt the slice using the buffered unused data key. When any data ciphertext needs to be decrypted, if a corresponding data key is buffered, the cloud storage system may directly decrypt the data ciphertext using the buffered data key.

Moreover, the cloud storage system may dynamically adjust the buffered data key.

For example, the number of the buffered data keys may be dynamically adjusted. The number of the buffered data keys is a key value. When too many data keys are buffered, excessive system memory is occupied. When the number of the data keys is too small, it may lead to the synchronization wait of the request, thereby increasing the user request delay. Therefore, the method of dynamically managing the buffer size may be used. The key buffer is a dynamic value, and the most suitable size of the key buffer may be inferred based on the historical data requested by the system and the changing trend of the current number of requests.

For the buffered unused data keys, when a part such as a half is used, new unused data keys may be acquired from the key management system to ensure that a sufficient number of unused data keys are buffered.

In addition, the buffered used data key may be the data key of a hot file. If all the used data keys are buffered, too much memory will be required, and the hot file is a file requested by the user for many times. If the user turns to the key management system to acquire a corresponding data key every time the user requests, it undoubtedly may increase the user request delay and increase the resource consumption.

How to determine the hot file may refer to the existing technology. For example, the heat of different files may be determined according to the number of user requests within the latest predetermined time period, and then N files with the highest heat may be determined as the hot files, and the data keys corresponding to the hot files are buffered, where N is a positive integer. Since the hot files are dynamically changing, the buffered used data keys are also dynamically changing.

It should be noted that the buffered storage medium is transitory, so that buffering the data keys may be considered as safe.

2) Streaming Encryption and Decryption

Both encryption and decryption operations require some time. In order to avoid the encryption and decryption operations leading to the increase of the user request delay, the streaming encryption and decryption mechanism is adopted in the present embodiment.

Specifically, when performing data writing, the cloud storage system may encrypt existing data in a buffer, while writing data into the buffer, and write encrypted data ciphertext into a back-end, such as a disk. Similarly, when performing data reading, the cloud storage system may decrypt existing data in the buffer, while writing data into the buffer, and return decrypted data plaintext to the user.

Figure 4:
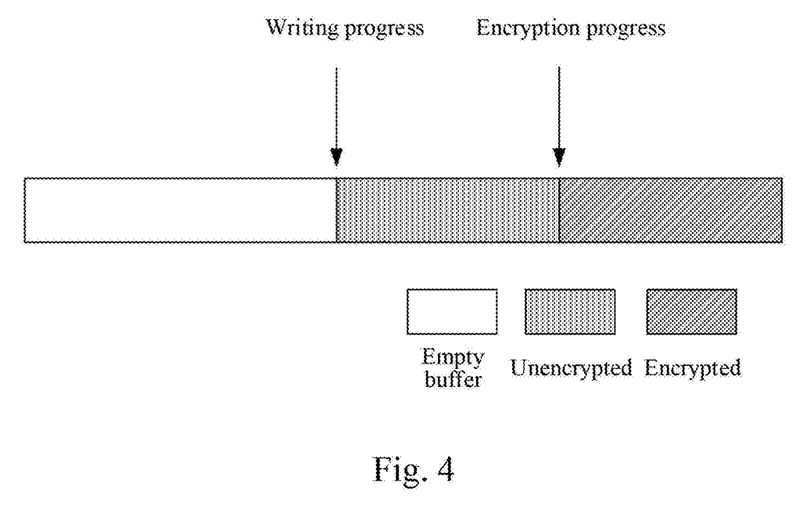
FIG. 4 is a schematic diagram of a streaming encryption method according to an embodiment of the present disclosure.

FIG. 4 is a schematic diagram of a streaming encryption method according to an embodiment of the present disclosure. As shown in FIG. 4, the writing of data and the encryption of data may be performed concurrently, thereby reducing the influence of the encryption operation on the user request delay.

The size of the buffer may be determined according to actual needs. For example, the buffer may store 1000 bytes of data. After writing 100 bytes of data (assuming as a slice) into the buffer, the 100 bytes of data may be encrypted while continuing to write data after the 100 bytes of data into the buffer. After the encryption is completed, the second 100 bytes of data may be encrypted, and in addition, the encrypted data ciphertext is written into the back-end.

In the present embodiment, a multi-layer key system may also be adopted to improve the security of the key. Since the key is used to encrypt and decrypt data in the cloud storage system, the security of the key directly determines the security of the data. Therefore, the security of the key is also crucial.

In order to ensure the security of the key, the key management system may adopt a multi-layer key encryption mechanism. Specifically, each data key in the key management system may be encrypted using a master key and stored in a form of ciphertext, each master key may be encrypted using a root master key and stored in a form of ciphertext, and each root master key may be encrypted and stored using a hardware encryptor.

From the data key, the master key to the root master key, a multi-layer key system is formed, which are all stored in the form of ciphertext on a physical medium, thereby fully ensuring the security of the key.

The security of the data ciphertext and the security of the key together determine the security of the data. In order to improve the security of the data, in the present embodiment, the encryption of the data and the encryption of the key are performed by two different systems, where the encryption of the data is completed by the cloud storage system, and the encryption of the key is completed by the key management system. The cloud storage system and the key management system are two independent systems that use different identification and authentication methods.

Figure 5:
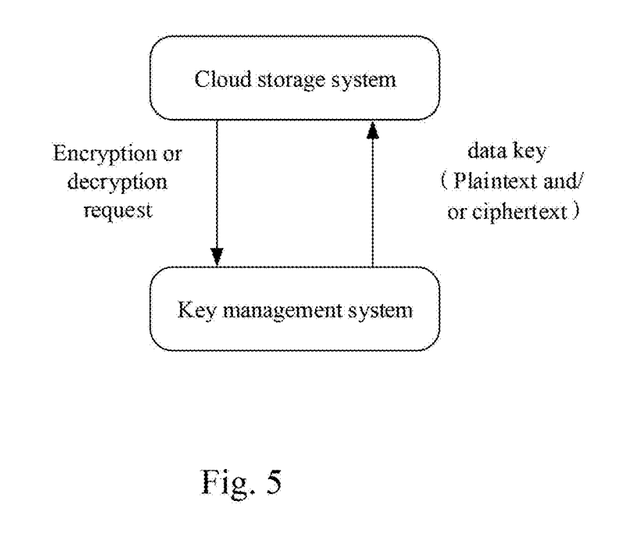
FIG. 5 is a schematic diagram of interaction between a cloud storage system and a key management system according to an embodiment of the present disclosure.

FIG. 5 is a schematic diagram of interaction between the cloud storage system and the key management system according to an embodiment of the present disclosure. As shown in FIG. 5, when any slice needs to be encrypted, the cloud storage system may send an encryption request to the key management system, so as to acquire a corresponding data key in a form of plaintext and a data key in a form of ciphertext from the key management system, and use the data key in the form of plaintext to encrypt the slice, store the encrypted data ciphertext and the data key in the form of ciphertext, and release the data key in the form of plaintext in the memory after the encryption is completed. When any data ciphertext needs to be decrypted, the cloud storage system may send a decryption request to the key management system, and send the data key in the form of ciphertext stored together with the data ciphertext to the key management system, thereby acquiring the data key in the form of plaintext returned by the key management system, decrypt the data ciphertext according to the data key in the form of plaintext, and release the data key in the form of plaintext in the memory after the decryption is completed.

It should be noted that, for the foregoing method embodiments, for the ease of description, they are expressed as a series of action combinations, but those skilled in the art should understand that the present disclosure is not limited by the described action sequence, according to the present disclosure, certain steps may be performed in other sequences or concurrently. Secondly, those skilled in the art should also understand that the embodiments described in the specification are certain preferred embodiments, and the actions and modules involved are not necessarily required by the present disclosure.

In summary, the solution described in the foregoing method embodiments adopts the key encryption solution of slice granularity, thereby avoiding the problems in the prior art and furthering improving the security of the data. Moreover, by adopting the dynamic key buffering and the streaming encryption and decryption mechanism, the user request delay, etc., are reduced, thereby improving the system performance. In addition, the security of the key is improved by using the multi-layer key system; and further, the security of the data is further improved by the method of separating data encryption from key encryption.

The above is an introduction to the method embodiments, and the solution of the present disclosure will be further described below by the apparatus embodiment.

Figure 6:
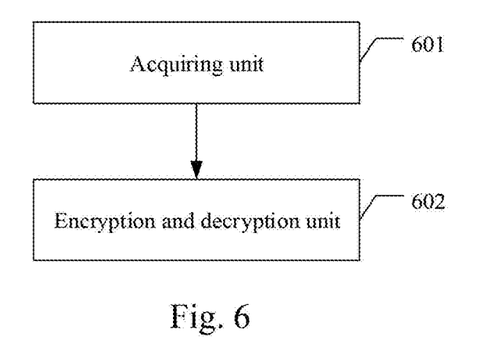
FIG. 6 is a schematic structural diagram of composition of an apparatus for processing data according to an embodiment of the present disclosure.

FIG. 6 is a schematic structural diagram of composition of an apparatus for processing data according to of an embodiment the present disclosure. The apparatus is applied to the cloud storage system. As shown in FIG. 6, the apparatus includes: an acquiring unit 601 and an encryption and decryption unit 602.

The acquiring unit 601 is configured to acquire a series of slices obtained by dividing a to-be-stored file.

The encryption and decryption unit 602 is configured to encrypt each slice by using a different data key, and store an encrypted data ciphertext.

After receiving a write request from a user, the acquiring unit 601 may divide the to-be-stored file uploaded by the user into multiple slices. The encryption and decryption unit 602 may encrypt each slice by adopting a key encryption method of slice granularity and using a different data key, and store the encrypted data ciphertext. Obviously, security has been greatly improved compared to the method in which multiple files are encrypted using the same key in the existing technology.

In addition, in the prior art, the security of the key is not well guaranteed. The key and the data ciphertext are usually stored in the same system, so that a data stealer may obtain the data ciphertext and the key from the same system at the same time, and thus the data ciphertext may be directly decrypted using the key.

However, in the present embodiment, the data ciphertext and the data key are stored separately. The encryption and decryption unit 602 may encrypt each slice according to a data key acquired from a key management system. In addition, when any data ciphertext needs to be decrypted, decrypt the data ciphertext according to a data key corresponding to the data ciphertext acquired from the key management system.

In addition, in order to improve system performance, the dynamic key buffering and the streaming encryption and decryption mechanism are further adopted in the present embodiment.

Accordingly, the encryption and decryption unit 602 may buffer the data key acquired from the key management system, where the buffered data key includes: an unused data key and a used data key. In this way, when any slice needs to be encrypted, the buffered unused data key may be directly used to encrypt the slice; and when any data ciphertext needs to be decrypted, if the data key corresponding to the data ciphertext is buffered, the buffered data key may be directly used to decrypt the data ciphertext.

In addition, the encryption and decryption unit 602 may dynamically adjust the buffered data key.

In addition, when performing data writing, the encryption and decryption unit 602 may encrypt existing data in a buffer, while writing data into the buffer, and write encrypted data ciphertext into a back-end; and when performing data reading, the encryption and decryption unit 602 may decrypt existing data in the buffer, while writing data into a buffer, and return decrypted data plaintext to a user.

In the present embodiment, a multi-layer key system may also be adopted to improve the security of the key. Specifically, each data key in the key management system may be encrypted using a master key and stored in a form of ciphertext; each master key may be encrypted using a root master key and stored in a form of ciphertext; and each root master key may be encrypted and stored using a hardware encryptor.

When any slice needs to be encrypted, the encryption and decryption unit 602 may acquire a data key in a form of plaintext and a data key in a form of ciphertext corresponding to the slice from the key management system, encrypt the slice using the data key in the form of plaintext, and store encrypted data ciphertext and the data key in the form of ciphertext; and when any data ciphertext needs to be decrypted, the encryption and decryption unit 602 may send the data key in the form of ciphertext stored together with the data ciphertext to the key management system, acquire the data key in the form of plaintext returned by the key management system, and decrypt the data ciphertext according to the data key in the form of plaintext.

For the specific operation procedure of the apparatus embodiment shown in FIG. 6, reference may be made to the corresponding description in the foregoing method embodiments, and repeated description thereof will be omitted here.

In summary, the solution described in the foregoing apparatus embodiment adopts the key encryption solution of slice granularity, thereby avoiding the problems in the prior art and furthering improving the security of the data. Moreover, by adopting the dynamic key buffering and the streaming encryption and decryption mechanism, the user request delay, etc., are reduced, thereby improving the system performance. In addition, the security of the key is improved by using the multi-layer key system; and further, the security of the data is further improved by the method of separating data encryption from key encryption.

Figure 7:
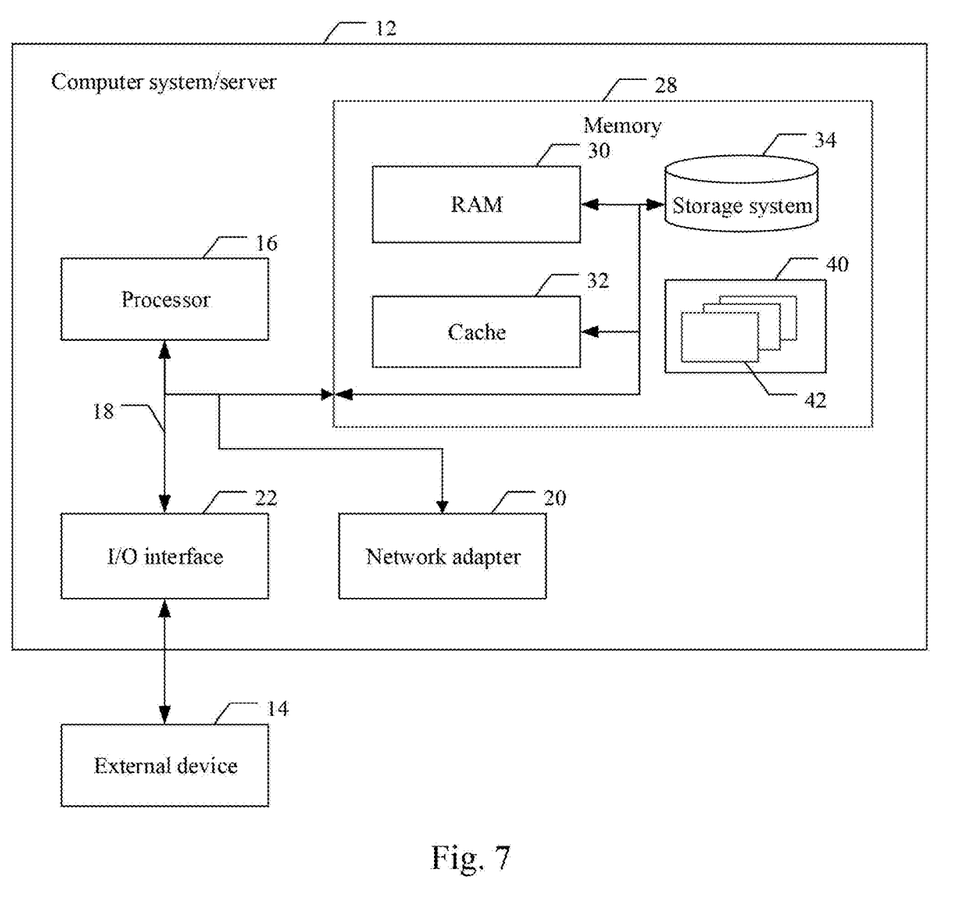
FIG. 7 shows a block diagram of a computer system/server 12 adapted to implement embodiments of the present disclosure.

FIG. 7 shows a block diagram of a computer system/server 12 adapted to implement embodiments of the present disclosure. The computer system/server 12 as shown in FIG. 7 is merely an example and should not impose any limitation on the function and scope of use of the embodiments of the present disclosure.

As shown in FIG. 7, the computer system/server 12 is embodied in the form of a general-purpose computing device. The components of the computer system/server 12 may include, but not limited to, one or more processors (processing units) 16, a memory 28, and a bus 18 that connects different system components, including the memory 28 and the processor 16.

The bus 18 represents one or more of several types of bus structures, including a memory bus or memory controller, a peripheral bus, a graphics acceleration port, a processor, or a local bus using any of a variety of bus structures. For example, these architectures include, but not limited to, Industry Standard Architecture (ISA) bus, Micro Channel Architecture (MAC) bus, Enhanced ISA bus, Video Electronics Standards Association (VESA) local bus, and Peripheral Component Interconnects (PCI) bus.

The computer system/server 12 typically includes a variety of computer system readable mediums. These mediums may be any available medium that can be accessed by the computer system/server 12, including transitory and non-transitory medium, removable and non-removable medium.

The memory 28 may include computer system readable medium in the form of transitory memory, such as a random access memory (RAM) 30 and/or a cache memory 32. The computer system/server 12 may further include other removable/non-removable, transitory/non-transitory computer system storage mediums. For example, a storage system 34 may be used to read and write non-removable, non-transitory magnetic medium (not shown in FIG. 7, commonly referred to as "hard disk drive"). Although not shown in FIG. 7, a disk drive for reading and writing a removable non-transitory disk (such as a "floppy disk"), and an optical disc drive for reading and writing a removable non-transitory disc (such as a CD-ROM, DVD-ROM or other optical mediums) may be provided. In these cases, each drive may be coupled to the bus 18 via one or more data medium interfaces. The memory 28 may include at least one program product having a set (e.g., at least one) of program modules configured to perform the functions of the various embodiments of the present disclosure.

A program/utility tool 40 having a set (at least one) of program modules 42 may be stored, for example, in the memory 28, such program modules 42 including, but not limited to, an operating system, one or more applications, other program modules and program data, and each of these examples or some combination may include the implementation of a network environment. The program module 42 typically performs the functions and/or method in the described embodiments of the present disclosure.

The computer system/server 12 may also be in communication with one or more external devices 14 (e.g., a keyboard, pointing device, display, etc.), and may also be in communication with one or more devices that enable the user to interact with the computer system/server 12, and/or in communication with any device (e.g., a network card, a modem, etc.) that enables the computer system/server 12 to communicate with one or more other computing devices. This communication may take place via an input/output (I/O) interface 22. Also, the computer system/server 12 may also communicate with one or more networks (e.g., a local area network (LAN), a wide area network (WAN), and/or a public network, such as the Internet) through a network adapter 20. As shown in FIG. 7, the network adapter 20 communicates with other modules of the computer system/server 12 via the bus 18. It should be understood that although not shown in the figure, other hardware and/or software modules may be utilized in conjunction with the computer system/server 12, including but not limited to: microcode, device drivers, redundant processing units, external disk drive arrays, RAID systems, tape drives and data backup storage systems.

The processor 16 executes various functional applications and data processing by running programs stored in the memory 28, such as implementing the method in the embodiment as shown in FIG. 2.

The present disclosure also discloses a computer readable storage medium, storing a computer program thereon, the program, when executed by a processor, implements the method in the embodiment as shown in FIG. 2.

Any combination of one or more computer readable mediums may be used. The computer readable medium may be a computer readable signal medium or a computer readable storage medium. The computer readable storage medium may be, for example, but not limited to, an electronic, magnetic, optical, electromagnetic, infrared, or semiconductor system, apparatus, or device, or any combination of the above. More specific examples (a non-exhaustive list) of the computer readable storage medium include: an electrical connection with one or more wires, portable computer disk, hard disk, random access memory (RAM), read only memory (ROM), erasable programmable read only memory (EPROM or flash), optical fiber, portable compact disk read only memory (CD-ROM), optical storage device, magnetic storage device, or any suitable combination of the above. In some embodiments of this disclosure, the computer readable storage medium may be any tangible medium that contains or stores a program, and the program may be used by or used in connection with a command execution system, apparatus, or device.

The computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element.

The program codes contained on the computer readable medium may be transmitted with any suitable medium including but not limited to: wireless, wired, optical cable, RF medium etc., or any suitable combination of the above.

A computer program code for performing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on the user's computer, partially executed on the user's computer, executed as a separate software package, partially executed on the user's computer and partially executed on a remote computer, or completely executed on a remote computer or server. In the circumstance involving a remote computer, the remote computer may be connected to the user's computer through any network, including local area network (LAN) or wide area network (WAN), or may be connected to an external computer (for example, connected through the Internet using an Internet service provider).

In the several embodiments provided by the present disclosure, it should be understood that the disclosed apparatus and method and the like may be implemented in other ways. For example, the apparatus embodiments described above are merely illustrative. For example, the division of the units is only a logical function division, and in the actual implementation, another division method may be possible.

The units described as separate components may or may not be physically separated, and the components displayed as units may or may not be physical units, that is, may be located in one place, or may be distributed to multiple network units. Some or all of the units may be selected according to actual needs to achieve the purpose of the present solution of the embodiments.

In addition, the functional units in the embodiments of the present disclosure may be integrated into one processing unit, or may exist physically separately, or two or more units may be integrated into one unit. The above integrated unit may be implemented in the form of hardware or in the form of hardware plus software functional units.

The above integrated unit implemented in the form of a software functional unit may be stored in a computer readable storage medium. The software functional unit is stored in a storage medium and includes instructions for causing a computer device (which may be a personal computer, a server, or a network device, etc.) or a processor to perform part of the steps of the method of the various embodiments of the present disclosure. The foregoing storage medium includes: a U disk, a mobile hard disk, a read-only memory (ROM), a random access memory (RAM), a magnetic disk, or an optical disk, and various mediums that can store program codes.

The above is only description of some embodiments of the present disclosure, and is not intended to limit the present disclosure. Any modifications, equivalent substitutions, improvements, etc. within the spirit and principles of the present disclosure, should be included in the scope of protection of the present disclosure.

What is claimed is:

1. A method for processing data, the method comprising:
   acquiring, by a cloud storage system, a series of slices obtained by dividing a to-be-stored file;
   encrypting, by the cloud storage system, each slice by using a different data key acquired from a key management system, wherein the cloud storage system and the key management system are two independent systems adopting different identification and authentication modes; and
   storing, by the cloud storage system, an encrypted data ciphertext in the cloud storage system,
   wherein the method further comprises,
   buffering, by the cloud storage system, the data key acquired from the key management system, wherein the buffered data key comprises: an unused data key and a used data key; wherein the cloud storage system buffers a used data key corresponding to a hot file, and a file is determined as the hot file based on a number of user requests for the file within a latest predetermined time period;
   in response to determining that any slice needs to be encrypted, encrypting the slice, by the cloud storage system, using the unused data key in the buffered data key; and
   in response to determining that any data ciphertext needs to be decrypted, and in response to determining that a used data key corresponding to the data ciphertext is buffered by the cloud storage system, decrypting the data ciphertext, by the cloud storage system, using the buffered used data key corresponding to the data ciphertext,
   wherein the method is performed by at least one hardware processor.

2. The method according to claim 1, wherein,
   the method further comprises: in response to determining that any data ciphertext needs to be decrypted, decrypting, by the cloud storage system, the data ciphertext according to a data key corresponding to the data ciphertext and acquired from the key management system.

3. The method according to claim 1, wherein,
   the method further comprises: dynamically adjusting, by the cloud storage system, the buffered data key.

4. The method according to claim 2, wherein,
   the method further comprises:
   in response to performing data writing, encrypting, by the cloud storage system, existing data in a buffer, while writing data into the buffer, and writing encrypted data ciphertext into a back-end; and
   in response to performing data reading, decrypting, by the cloud storage system, existing data in a buffer, while writing data into the buffer, and returning decrypted data plaintext to a user.

5. The method according to claim 2, wherein,
   each data key in the key management system is encrypted using a master key and stored in a form of ciphertext; each master key is encrypted using a root master key and stored in a form of ciphertext; and each root master key is encrypted and stored using a hardware encryptor.

6. The method according to claim 5, wherein,
   in response to determining that any slice needs to be encrypted, acquiring, by the cloud storage system, a data key in a form of plaintext and a data key in a form of ciphertext corresponding to the slice from the key management system, encrypting the slice using the data key in the form of plaintext, and storing encrypted data ciphertext and the data key in the form of ciphertext; and in response to determining that any data ciphertext needs to be decrypted, sending, by the cloud storage system, the data key in the form of ciphertext stored together with the data ciphertext to the key management system, acquiring the data key in the form of plaintext returned by the key management system, and decrypting the data ciphertext according to the data key in the form of plaintext.

7. An apparatus for processing data, applied to a cloud storage system, comprising:
at least one processor; and
a memory storing instructions, wherein the instructions when executed by the at least one processor, cause the at least one processor to perform operations, the operations comprising:
acquiring a series of slices obtained by dividing a to-be-stored file;
encrypting each slice by using a different data key acquired from a key management system, wherein the cloud storage system and the key management system are two independent systems adopting different identification and authentication modes; and
storing an encrypted data ciphertext in the cloud storage system,
wherein the operations further comprise,
buffering, by the cloud storage system, the data key acquired from the key management system, wherein the buffered data key comprises: an unused data key and a used data key; wherein the cloud storage system buffers a used data key corresponding to a hot file, and a file is determined as the hot file based on a number of user requests for the file within a latest predetermined time period;
in response to determining that any slice needs to be encrypted, encrypting the slice, by the cloud storage system, using the unused data key in the buffered data key; and
in response to determining that any data ciphertext needs to be decrypted, and in response to determining that a used data key corresponding to the data ciphertext is buffered by the cloud storage system, decrypting the data ciphertext, by the cloud storage system, using the buffered used data key corresponding to the data ciphertext.

8. The apparatus according to claim 7, wherein,
the operations further comprise: in response to determining that any data ciphertext needs to be decrypted, decrypting the data ciphertext according to a data key corresponding to the data ciphertext and acquired from the key management system.

9. The apparatus according to claim 7, wherein,
the operations further comprise: dynamically adjusting the buffered data key.

10. The apparatus according to claim 8, wherein,
the operations further comprise:
in response to performing data writing, encrypting existing data in a buffer, while writing data into the buffer, and writing encrypted data ciphertext into a back-end; and
in response to performing data reading, decrypting existing data in a buffer, while writing data into the buffer, and returning decrypted data plaintext to a user.

11. The apparatus according to claim 8, wherein,
each data key in the key management system is encrypted using a master key and stored in a form of ciphertext; each master key is encrypted using a root master key and stored in a form of ciphertext; and each root master key is encrypted and stored using a hardware encryptor.

12. The apparatus according to claim 11, wherein,
in response to determining that any data needs to be encrypted, acquiring a data key in a form of plaintext and a data key in a form of ciphertext corresponding to the slice from the key management system, encrypting the slice using the data key in the form of plaintext, and storing encrypted data ciphertext and the data key in the form of ciphertext; and
in response to determining that any data ciphertext needs to be decrypted, sending the data key in the form of ciphertext stored together with the data ciphertext to the key management system, acquiring the data key in the form of plaintext returned by the key management system, and decrypting the data ciphertext according to the data key in the form of plaintext.

13. A non-transitory computer readable storage medium, storing a computer program thereon, wherein the computer program, when executed by a processor, causes the processor to perform operations, the operations comprising:
acquiring a series of slices obtained by dividing a to-be-stored file;
encrypting each slice by using a different data key acquired from a key management system, wherein the cloud storage system and the key management system are two independent systems adopting different identification and authentication modes; and
storing an encrypted data ciphertext in the cloud storage system,
wherein the operations further comprise,
buffering, by the cloud storage system, the data key acquired from the key management system, wherein the buffered data key comprises: an unused data key and a used data key; wherein the cloud storage system buffers a used data key corresponding to a hot file, and a file is determined as the hot file based on a number of user requests for the file within a latest predetermined time period;
in response to determining that any slice needs to be encrypted, encrypting the slice, by the cloud storage system, using the unused data key in the buffered data key; and
in response to determining that any data ciphertext needs to be decrypted, and in response to determining that a used data key corresponding to the data ciphertext is buffered by the cloud storage system, decrypting the data ciphertext, by the cloud storage system, using the buffered used data key corresponding to the data ciphertext.

14. The non-transitory computer readable storage medium according to claim 13, wherein,
the operations further comprise: in response to determining that any data ciphertext needs to be decrypted, decrypting the data ciphertext according to a data key corresponding to the data ciphertext and acquired from the key management system.

15. The non-transitory computer readable storage medium according to claim 14, wherein,
the operations further comprise: dynamically adjusting the buffered data key.

16. The non-transitory computer readable storage medium according to claim 14, wherein,
the operations further comprise:
in response to performing data writing, encrypting existing data in a buffer, while writing data into the buffer, and writing encrypted data ciphertext into a back-end; and
in response to performing data reading, decrypting existing data in a buffer, while writing data into the buffer, and returning decrypted data plaintext to a user.

17. The non-transitory computer readable storage medium according to claim 14, wherein, each data key in the key management system is encrypted using a master key and stored in a form of ciphertext; each master key is encrypted using a root master key and stored in a form of ciphertext; and each root master key is encrypted and stored using a hardware encryptor.

* * * * *